Oct. 27, 1931.  J. COUTIN  1,829,340
CUSHIONING DEVICE FOR RECIPROCATING SIEVES AND OTHER APPARATUS
Filed May 11, 1928   2 Sheets-Sheet 1

Inventor
Jean Coutin
By Edward C. Saenett
Atty.

Oct. 27, 1931.  J. COUTIN  1,829,340
CUSHIONING DEVICE FOR RECIPROCATING SIEVES AND OTHER APPARATUS
Filed May 11, 1928  2 Sheets-Sheet 2

Patented Oct. 27, 1931

1,829,340

UNITED STATES PATENT OFFICE

JEAN COUTIN, OF NOGENT-SUR-MARNE, FRANCE, ASSIGNOR TO PRÉPARATION INDUSTRIELLE DES COMBUSTIBLES (SOCIÉTÉ ANONYME), OF NOGENT-SUR-MARNE, FRANCE

CUSHIONING DEVICE FOR RECIPROCATING SIEVES AND OTHER APPARATUS

Application filed May 11, 1928, Serial No. 277,021, and in France May 14, 1927.

The present invention relates to a device for cushioning the forces of inertia of reciprocating sieves and other apparatus and for restoring a part of the energy accumulated during the cushioning, the device being of the type which comprises a piston connected to one of the sieves or other device and moving in a cylinder connected to the other sieve or device, the said cylinder containing a liquid and a gas so as to combine the resistance due to the compression of the liquid with the elastic force due to the compression of the gas.

Devices are known for balancing the forces of inertia by means of springs. Such devices are subject to the following drawbacks:

First, the springs may break.

Second, the instantaneous forces of inertia are absorbed by the springs only at the working speed of the apparatus and special means must be used for starting the apparatus by reason of the considerable resistance offered by the springs.

Devices are also known for balancing the forces of inertia by means of a piston and a cylinder. Some of them use the compression of gases, but offer several drawbacks: they cannot be provided with any outlet or inlet for gas; hence a heating or a vacuum results; as pneumatic apparatus, they do not offer any safety from the point of view of the resistance; they are not practical in the case of apparatus having a small stroke. Other devices employ the compression of a liquid in connection with the compression of a gas; in these the cylinders are generally connected together by a conduit in the cylinder wall in order to allow the gas to be driven back on one side or the other of the piston. The drawbacks of such apparatus are as follows:

First, eddies are produced between the gas and the liquid by reason of their difference of density and of the tendency of the gas to pass above the liquid.

Second, they are not practical in the case of apparatus having a small stroke.

Third, the compression produces heat which, after a short time, renders it impossible to use the apparatus.

The present invention obviates all the above mentioned drawbacks. Particularly, the arrangement of the gas space in the cylinder is such that no eddy or mixture between the gas and liquid may occur. The cylinder is in communication with two chambers which are connected together by a pipe presenting a large external surface so as to effect a cooling of the compressed gas. This pipe, or by-pass tube, is provided with a regulating valve. Moreover, the two chambers have a cross section different from that of the cylinder, so that during the pistoning movement the fluids have in the chambers a displacement different from that in the cylinder. This arrangement is particularly advantageous in the case where movements of high speed and small amplitude are to be damped, the difference in cross section between the chambers and cylinder permitting much higher air compressions to be obtained than in the case of an ordinary cylinder. Indeed with a small piston stroke, in order to obtain a high compression, the dead space would have to be reduced to too small a value and shocks would occur at the end of the strokes. The present arrangement, on the contrary, allows a high compression to be easily obtained so as to effectively oppose the considerable forces due to the high speed.

Finally, the boxes of the sieves or other moving masses may be connected to the cylinder and the piston by ash wood links in order to eliminate joints.

The appended drawings show by way of example a constructional form of the apparatus.

Figure 1:
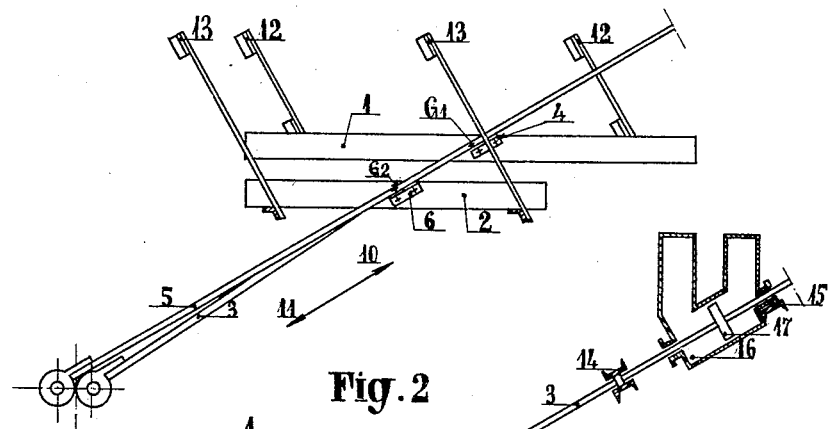
Fig. 1 is a side view of the apparatus.
Figure 2:
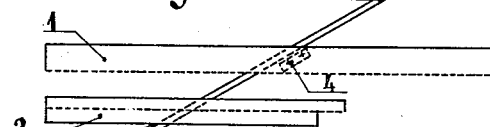
Fig 2 is a section on line 2—2 of Fig. 3.
Figure 3:
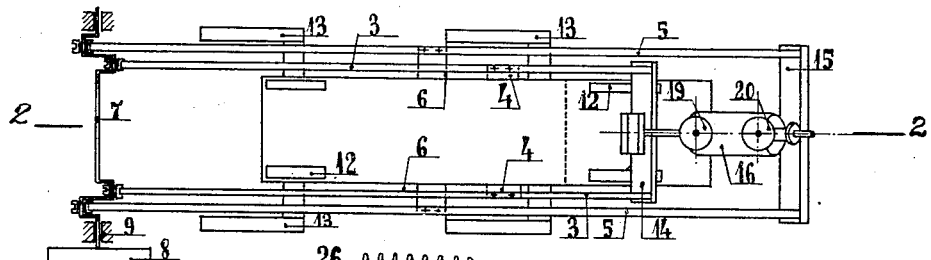
Fig. 3 is a plan view of the apparatus.

The sifting apparatus consists of two sieve boxes 1 and 2 provided with perforated sheet metal members of the same weight, whose centers of gravity are situated at $G'$ and $G^2$. The box 1 is actuated by two links 3 of ash wood which are bolted to the angle pieces 4; the box 2 is actuated by two links 5 of like construction which are bolted to the angle pieces 6. The links 3 and 5 are actuated by a crank-shaft 7 driven by a flywheel pulley 8 and mounted in the bearings 9.

The said boxes are caused to be displaced in parallel position in the direction of the arrows 10 and 11, since they are supported by the ash wood strips 12 and 13. Since the said boxes are displaced at all times in the inverse direction, the sieve apparatus will be equilibrated.

Figure 4:
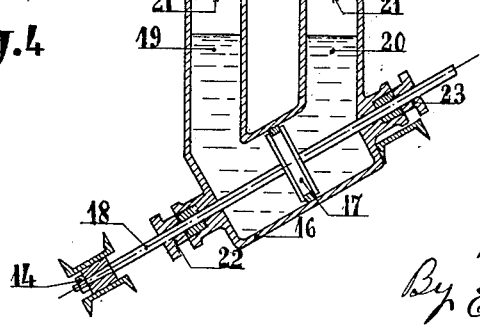
Fig. 4 is a sectional view of the damping cylinder shown in Fig. 2, but on a larger scale.

The device for damping the efforts of inertia of the said boxes is as follows:

The links 3 and 5 are extended beyond the angle pieces 4 and 6 securing them to the boxes; the links 3 are bolted to a cross-piece 14 and the links 5 to a cross-piece 15. To this latter is bolted a cylinder 16 which is shown on a large scale in Fig. 4. In the said cylinder is movable a piston 17, optionally provided with packing rings, which piston is secured to the cross-piece 14 by the piston rod 18. The cylinder 16 is extended towards the top at each end by two vertical compression tubes 19 and 20. The cross sectional area of each of the tubes 19 and 20 is much smaller than the area of piston 17, being only about one-tenth of the latter. The said tubes are closed at the top, and their plugs are pierced with a small hole 21. The piston rod 18 traverses the two cylinder ends through the respective stuffing boxes 22 and 23. The cylinder 16 contains glycerine, as also the tubes 19 and 20 up to a certain level. The level of the gylcerine is the same in both tubes 19 and 20 when the piston is in its middle position.

At the normal speed of the sieve apparatus, which is quite considerable, there will be produced great efforts of acceleration at each end of the stroke, which efforts are due to the weight of the boxes in motion. The stroke of the piston is very short, but the cylinder 16 is filled with glycerine and for a short movement of distance of the piston, the glycerine will be displaced through a distance which is ten times greater in the vertical tubes 19 and 20. If the holes 21 would not be provided, it would be feasible, for example, by means of this great displacement of the glycerine in the tubes 19 and 20, to compress the air in the upper parts of said tubes to a high pressure, for example 15 kgs. per sq. cm. If the top surface of the glycerine in 19 and 20 is 15 sq. cm. and the surface of the piston 17 is 150 sq. cm., the effort due to this compression of the air will be 300 kgs. upon the surface of the glycerine in 19 and 20, and 3000 kgs. upon the piston 17, according to Pascal's principle.

It is feasible to employ holes 21 of sufficiently small size that during a compression stroke only a small amount of air would have time to escape through such holes, the speed of the sieve apparatus being considerable, as above mentioned. If it is admitted that by the use of said holes the pressure is reduced to 16 kgs. per sq. cm. at the end of the stroke, this will produce an effort of 240 kgs. upon the surface of the glycerine in 19 and 20, and 2400 kgs. on the piston 17.

At each end of the stroke, the force produced on one or the other faces of the piston 17 will oppose the force of inertia, and there may be obtained a force which is practically equal to the force of inertia, thus equilibrating such force of inertia. The actuating links and the crank-shaft are subjected to small stresses, and only a reduced amount of power is necessary to operate the apparatus.

When starting, if the holes 21 were not provided, it would be necessary to produce a great effort in order to set the sieve apparatus in action, since the efforts of inertia due to the boxes are zero at the start, and will not equilibrate the effort of air compression in the tubes 19 and 20. The power required to operate the apparatus at the normal speed is very small, but a powerful motor would be necessary for starting purposes, unless special means were used, for instance by increasing the stroke of the boxes at the same time as the speed. This drawback is obviated by the holes 21. In fact, when starting the apparatus, the speed is small and the air will have time to issue through the holes 21. The pressure of the air at the end of the stroke in the tubes 19 and 20 increases concurrently with the speed of the sieve, i. e. at the same time as the efforts of inertia to be overcome. These efforts will therefore be equilibrated for all speeds of the sieve apparatus.

The holes 21 also afford another advantage; if they were not provided, the air would become heated by reason of the successive compressions, as well as by friction. Owing to the said holes, a certain amount of air will enter and leave through the tubes 19 and 20, thus maintaining the proper temperature of the air.

The use of the holes 21 affording an atmospheric communication for the compression tubes 19 and 20 when the latter are not connected together by means of the tube 26 may prove a drawback. Since the pressure in the tubes 19 and 20 attains 16 kgs. per sq. cm., the air will be expelled to the exterior at a much greater speed than that with which the air enters the tubes containing a vacuum. The pressure causing this latter being less than atmospheric pressure, a vacuum will be formed above the liquid in the tubes 19 and 20.

Figure 5:
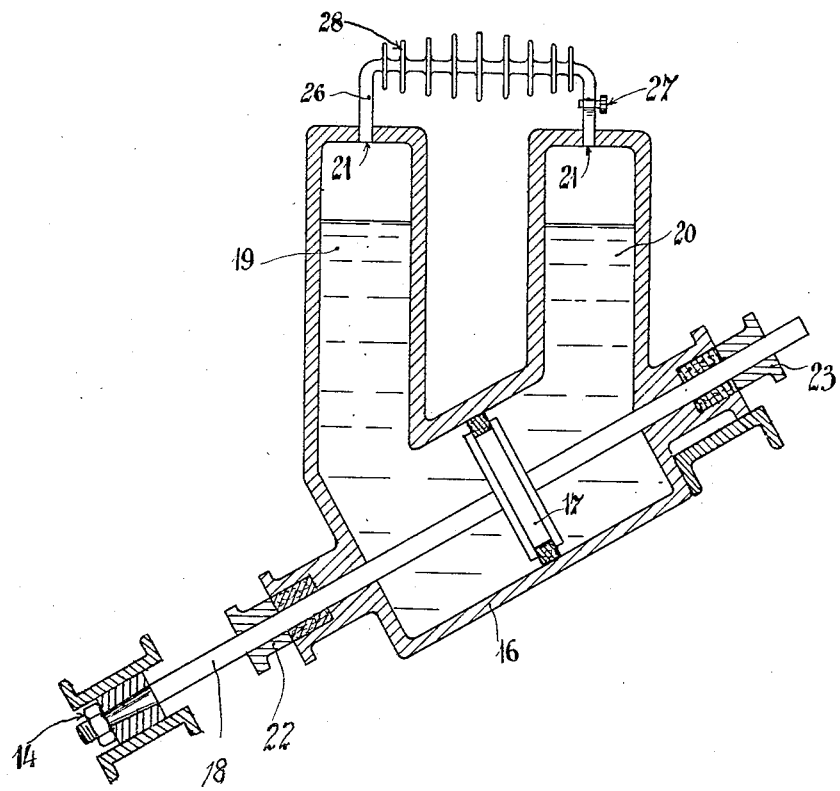
Fig. 5 is a similar view of another construction of the said cylinder.

To obviate this drawback, the holes 21 can be connected by such a tube 26 that the air issuing from the tube 19 will be obliged to enter the tube 20. The said tube 26 may be provided with a regulating cock 27. It may be made of brass and may have a large surface in order to cool the air circulating from the tube 19 to the tube 20, and inversely. The whole device may also be provided with cooling wings or flanges 28, see Fig. 5.

The said arrangements according to the invention are applicable to sifting apparatus other than what has been described, but the said apparatus is advantageous from the fact that it dispenses with the pivot joints which are subject to wear.

It is also feasible to dispose the crank-shaft or shaft carrying actuating eccentrics, as well as the damping cylinder, in any suitable position.

The apparatus may further comprise a certain number of damping cylinders, and the aforesaid devices may be employed upon oscillating apparatus of all types.

What I claim is:

1. A device for cushioning the forces of inertia of reciprocating masses and for restoring a part of the energy accumulated during the cushioning, said device comprising a piston connected to one of the masses and a cylinder connected to the other mass, said piston moving in said cylinder, two vertical tubes extending respectively from the ends of the cylinder, said tubes and cylinder inclosing a liquid and a gas, the latter being contained in the upper portions of said tubes, with the levels of separation of the liquid and gas in the same horizontal plane, and a by-pass pipe having a large external surface adapted to be cooled connecting said vertical tubes.

2. The combination set forth in claim 1 in which said by-pass pipe is provided with a regulating valve.

3. The combination set forth in claim 1 in which said vertical tubes have a cross section different from that of said cylinder, the arrangement being such that the fluid in said tubes has a path of flow different from that of said piston.

In testimony whereof I hereunto affix my signature.

JEAN COUTIN.